United States Patent [19]

Tanka et al.

[11] 4,280,162

[45] Jul. 21, 1981

[54] GROUND FAULT CIRCUIT INTERRUPTER

[75] Inventors: David M. Tanka, Lake Katrine; Thomas G. Reynolds, Woodstock, both of N.Y.

[73] Assignee: North American Philips Corporation, New York, N.Y.

[21] Appl. No.: 821,710

[22] Filed: Aug. 4, 1977

[51] Int. Cl.³ ............................................. H02H 3/28
[52] U.S. Cl. .................. 361/45; 324/117 R; 361/50; 361/204
[58] Field of Search .................. 361/42, 44, 45, 46, 361/47, 48, 49, 50, 93, 204; 340/253 R, 253 H, 253 N, 253 Q, 248 D, 664; 336/175, 176; 324/117 R, 133, 127

[56] References Cited

U.S. PATENT DOCUMENTS

| 2,958,036 | 10/1960 | Gilbert | 324/117 R X |
| 3,396,338 | 8/1968 | Buchanan et al. | 324/117 R |
| 3,465,250 | 9/1969 | Schilling | 324/127 |
| 4,021,729 | 5/1977 | Hudson, Jr. | 324/117 R X |

Primary Examiner—Harry E. Moose, Jr.
Attorney, Agent, or Firm—Bernard Franzblau

[57] ABSTRACT

A device for sensing current flow in an electric conductor employs a ferromagnetic core coupled to the conductor and a control winding on the core for applying a periodic magnetic flux to a part of the core of a magnitude to vary the core permeability, preferably driving a part of the core in and out of saturation. The periodic flux interrupts any flux circulating in the core due to current flow in the conductor. An output winding on the core has a signal voltage induced therein whose amplitude is determined by the rate of change of the interrupted circulating flux. The device effectively amplifies a small current input signal to a relatively high output level. A bias winding may be wound on the core to compensate for stray magnetic fields in the vicinity of the device.

11 Claims, 14 Drawing Figures

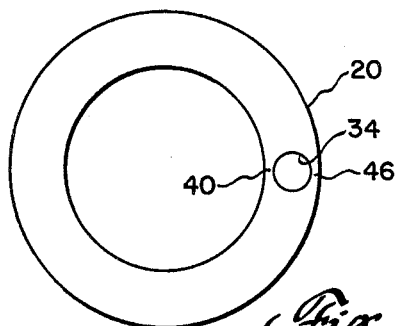
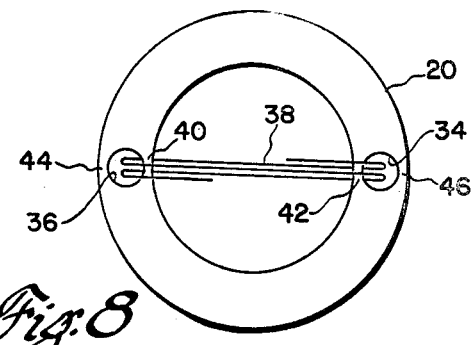
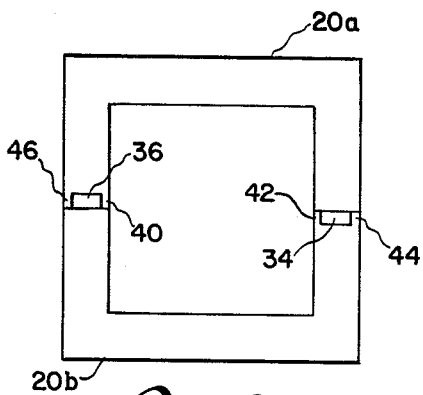
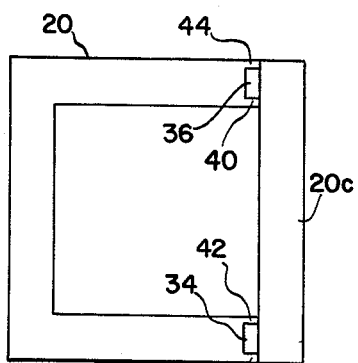
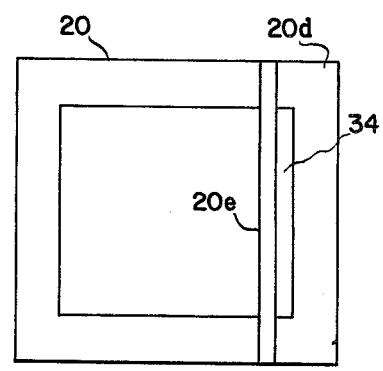
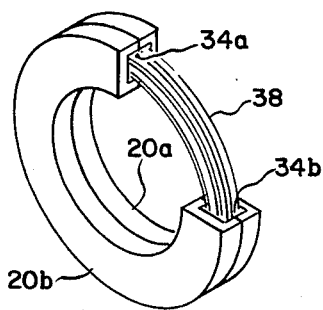
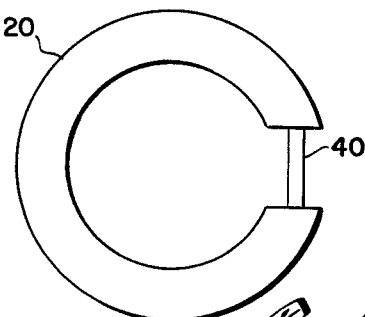
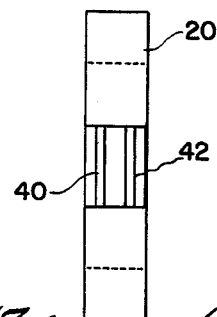
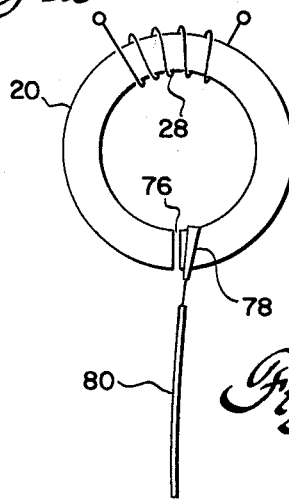
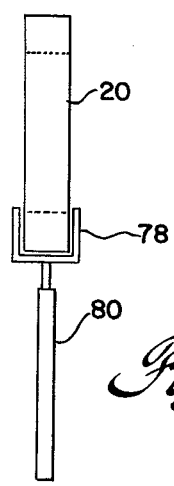

GROUND FAULT CIRCUIT INTERRUPTER

BACKGROUND OF THE INVENTION

This invention relates to a low level current sensing device and more particularly to a ground fault interrupter circuit for sensing an undesired ground current fault or other hazardous condition in the current supply conductors of an electrical distribution system and for automatically interrupting the current flow to a utility device upon the detection of the ground fault.

Ground Fault Circuit Interruption (GFCI) devices currently available utilize a differential current transformer inductively coupled with the line conductors of a distribution system providing electrical power to a load. The transformer is also provided with a multi-turn secondary winding for sensing a current imbalance in the aforesaid line conductors and in response thereto it develops an output signal proportional to the current imbalance to initiate an interruption of the current supplied to the load via the line conductors. Under normal conditions, i.e. in the absence of a fault on the line conductors, all of the current flowing to the load through one conductor returns to the power source through the other conductor so that the respective currents in the two line conductors are equal in magnitude and introduce equal and oppositely directed flux fields in the transformer core, resulting in a zero secondary output voltage. However, if a line conductor experiences a ground falult condition, such as occurs when a human body comes in contact therewith, a portion of the current returns to the power source via an external ground circuit rather than the neutral line conductor. As a result of the ground fault, the currents in the line conductors, i.e. in the primary windings of the differential transformer, are no longer equal so that a resultant flux is established in the transformer core. If the ground fault current exceed a predetermined threshold level, e.g. 5 milliamps, the GFCI device is designed so that the resultant core flux induces a signal voltage in the transformer secondary winding of a magnitude to initiate, after amplification, operation of a circuit breaker which opens the line conductors to the load.

Another problem that exists in many of the prior art differential transformer ground fault protective circuits relates to the reduced sensitivity of a GFCI device to a ground fault in the event of an inadvertent grounding of the neutral line conductor on the load side of the distribution system. In a power distribution system where the neutral conductor is grounded at the power source side, an inadvertent ground occurring on the neutral conductor at the load side may render the protective circuit ineffective. This problem occurs because a ground fault on the neutral conductor results in the neutral conductor becoming a shorted or low impedance winding of the differential transformer. In order to overcome this problem, a grounded neutral conductor fault condition must be detected by the circuit, or the circuit must be made insensitive to the aforesaid ground fault condition. Several systems have been developed to overcome this problem. For example, U.S. Pat. No. 3,473,091 discloses a ground leakage differential protective circuit in which an impedance is inserted in the neutral line to detect a low impedance to ground in the neutral conductor. U.S. Pat. No. 3,611,035 describes the use of a high frequency tickler coil to induce a high frequency voltage on the neutral conductor for detecting a low impedance to ground in the neutral conductor.

Other forms of grounded neutral protection circuits have been proposed in ground fault circuit interrupters which are generally characterized by the employment of an auxiliary transformer core inductively coupled to the neutral conductor. The present invention however pertains to GFCI devices generally and does not require for its practice a particular form of grounded neutral protection circuit from among those known in the art.

Although prior art ground fault interrupters utilizing the differential transformer technique are useful, they nevertheless are subject to certain inherent limitations which it is an object of the present invention to overcome. For example, in order for a prior art differential transformer GFCI device to sense an unbalanced current flow of the order of 5 milliamps or less in the supply line conductors, it is usually necessary to provide a secondary sensing winding containing a thousand or more turns. Despite the large number of turns on the sensing winding, a low level signal was nevertheless induced therein which generally required additional means, such as an electronic amplifier, to raise the signal to a level sufficient to operate a line conductor circuit breaker or the like. The requirement of an amplifier to amplify the signal to an adequate level to trip a circuit breaker increases the size and cost of the GFCI device. In addition, the amplifier itself is a source of "noise" which is amplified along with the desired output signal. This reduces the overall signal-to-noise ratio of the ground fault interrupter device. Thus, the sensitivity of the ground fault detector is limited to fault signals substantially in excess of the maximum noise levels produced by the amplifier.

In addition, because the output signal of the differential transformer is dependent upon the rate of change in magnetic flux $$\left( e = -N \frac{d\phi}{dt} \right),$$

the output sensitivity of the differential transformer is greatly reduced at low frequencies and DC signals cannot be detected at all. At the customary 60 HZ line frequency in use today, transformer design theory generally requires the use of high permeability core materials, a large number of winding turns and cores having large cross-sectional areas and short magnetic path lengths. These limitations all contribute to the high costs associated with the differential transformer GFCI devices.

SUMMARY OF THE INVENTION

It is therefore an object of the present invention to provide an improved ground fault circuit interrupter that overcomes the aforementioned disadvantages of the prior art differential transformer GFCI devices.

A general object of the invention is to provide a new and improved ground fault protective system for assuring the interruption of an electric distribution circuit when a low impedance ground fault occurs on a line conductor of the distribution circuit.

Another object is to provide a ground fault interrupter utilizing a variable reluctance magnetic core device that provides a high sensitivity thereby to detect low level AC or DC signals.

A further object of the invention is to provide a ground fault interrupter comprising a high sensitivity magnetic core device which provides an output signal at a level that does not require further amplification in order to operate a circuit breaker or the like.

Yet another object of the invention is to provide a ground fault interrupter that provides adequate signal levels using a magnetic core composed of a relatively inexpensive ferromagnetic or ferrimagnetic material, for example, a ferrite material.

A still further object of the invention is to provide a ground fault interrupter that exhibits an improved signal-to-noise ratio over prior art devices.

Another object is to provide a ground fault circuit interrupter of the above character which is compact, reliable in operation and relatively inexpensive to manufacture.

It is also an object of the invention to provide a current sensing device utilizing a saturable magnetic core which effectively amplifies a current flowing in a conductor magnetically coupled to the core.

The foregoing and other objects are achieved in accordance with the present invention by means of a ground fault interruption circuit which includes a magnetically controlled core inductively or flux coupled to one or more line conductors. An output sense winding of relatively few turns is wound on the core to provide an output signal when an imbalance current of a given magnitude occurs in the line conductors due to a ground fault condition. In normal operation, equal currents in the line conductors induce equal and opposing magnetic flux fields in the core so that a zero signal is induced in the sense winding. The aforesaid current imbalance produces a resultant circulating flux in the core. Control means are coupled to the core for alternately applying a control flux to a selected region of the core of a magnitude to drive said core region into saturation, or very nearly into saturation, at a frequency that is substantially higher than the frequency of the power source coupled to the line conductors. Each time the core control region approaches magnetic saturation, its reluctance increases, thereby opposing the circulation of the resultant flux produced by the current imbalance in the line conductors. Since the control region is located magnetically in series with the core main frame, the resultant circulating flux in the core will change in response to the local changes in core reluctance in the control region. As a result of the high frequency interruptions of the circulating flux, there occurs a high rate of change of flux in the core per unit of time (d$\phi$/dt) and hence a relatively large signal is induced in the core output sense winding, thereby producing a highly sensitive current sensing device. By controlling the core reluctance in this way, the input current signal is effectively amplified in the core to a level such that the signal voltage induced in the output sense winding is adequate, after simple detection, to operate a threshold circuit that controls a line circuit breaker, and without the interposition of a signal amplifier or the like between the sense winding and a switching device provided for operating the circuit breaker. A control winding is preferably coupled to the magnetic core for applying the aforesaid control flux thereto.

A further feature of the invention is the provision of means for applying a DC bias flux to the magnetic core which biases the core to the linear portion of its B-H characteristic curve, thereby overcoming the effects of any residual flux density in the core and also providing compensation for the effects of any external magnetic fields in the vicinity of the magnetic core.

As was noted above, the output sensitivity of a differential transformer is relatively low at low frequencies such as the 60 Hz normally used in power distribution systems because of the low rate of change of magnetic flux. In contrast, the high frequency interruptions of the biased circulating flux of the present invention will produce a current sensor having a high sensitivity and output. More particularly, the output signal from the sense winding is dependent upon the rate of change at which the magnetic flux linking the sense winding is interrupted, which is controlled by the rate of change of reluctance that occurs in the core control region. This in turn is controlled by the rate of change of current supplied to the control winding. When a sine wave current is applied to the control winding, the rate of change of flux is defined by the sine wave frequency. Frequencies ranging from 1 KHZ to the low megahertz region will provide satisfactory results depending upon the core material and type of construction. Rectangular wave and pulse type signals also can be used to drive the control winding. In this case, the rise time of the signals is the important factor providing high sensitivity of the device. The rise time of the current waveform for rectangular and pulse type signals should be comparable to the range of frequencies mentioned above, rise times faster than 5 microseconds being preferred. As long as the rise times of the rectangular and pulse type signals are fast, the repetition rates thereof need not be high, with rep rates comparable to the 60 Hz line frequency being conceivable.

The configuration and construction of the magnetic core can be modified to produce other specific advantages. For example, in accordance with another feature of the invention, different magnetic materials are utilized in the main core region and in the core control region so that the material selected for each region can be chosen to provide the optimum magnetic characteristics suitable for each respective region. For example, the material selected for the control region of the magnetic core can be chosen for its magnetic saturation properties, whereas the material of the main core region can be selected to provide a high magnetic permeability so as to provide a large output signal.

The inherent limitations described above for GFCI devices utilizing a differential current transformer are substantially eliminated by the novel apparatus of the invention, to be described in greater detail below. The invention makes it possible to use core materials with lower permeabilities, for example, an inexpensive ferrite core, and coils with fewer turns, i.e. a single turn primary winding and a secondary sense winding composed of a relatively small number of turns. This combination makes the apparatus very attractive from a cost point of view. The foregoing advantages are made possible by the provision of a control winding driven by current pulses having fast rise times, or by high frequency sinusoidal waves, having sufficient drive amplitude to saturate the core control region thereby causing the permeability to drop, or the reluctance to increase, during the period of time in which the core section is saturated, thus interrupting any circulating flux present within the core. The control winding effectively turns the circulating flux in the core on and off at a rate of change much faster than the 60 Hz line frequency. The voltage induced in the output sense winding is proportional to the rate of change of magnetic flux coupled therewith, and the rate of change of magnetic flux is determined by the control winding which thus results in greater sensitivity and higher signal output levels. It therefore becomes possible to drive a threshold circuit directly, in other words without additional amplification devices. Fewer overall components are thus required compared with the differential transformer GFCI devices. The absence of amplifiers results in a better signal-to-noise ratio. Low frequency and DC signals can now be detected with relative ease and with an inexpensive and simple apparatus. The core construction is also cheaper since the laminated cores generally required in the differential transformer devices is no longer necessary in the novel apparatus of the invention. The use of high permeability core materials in the prior art devices results in high remanence (Br) values which poses a further problem with regard to DC shock requirements of the device, a problem substantially avoided by the present invention which allows the use of core materials having a low remanence value and which are capable of being magnetically biased.

The invention accordingly comprises the features of construction and the combination of elements and arrangement of parts which will be exemplified in the apparatus hereinafter set forth, whereas the scope of the invention will be indicated by the appended claims.

BRIEF DESCRIPTION OF THE DRAWINGS

The foregoing and other objects, features and advantages of the invention will become apparent from the following detailed description when read in conjunction with the accompanying drawing in which:

FIGS. 7-14 show various embodiments of the magnetic cores suitable for use in the invention.

DESCRIPTION OF THE PREFERRED EMBODIMENTS

Figure 1:
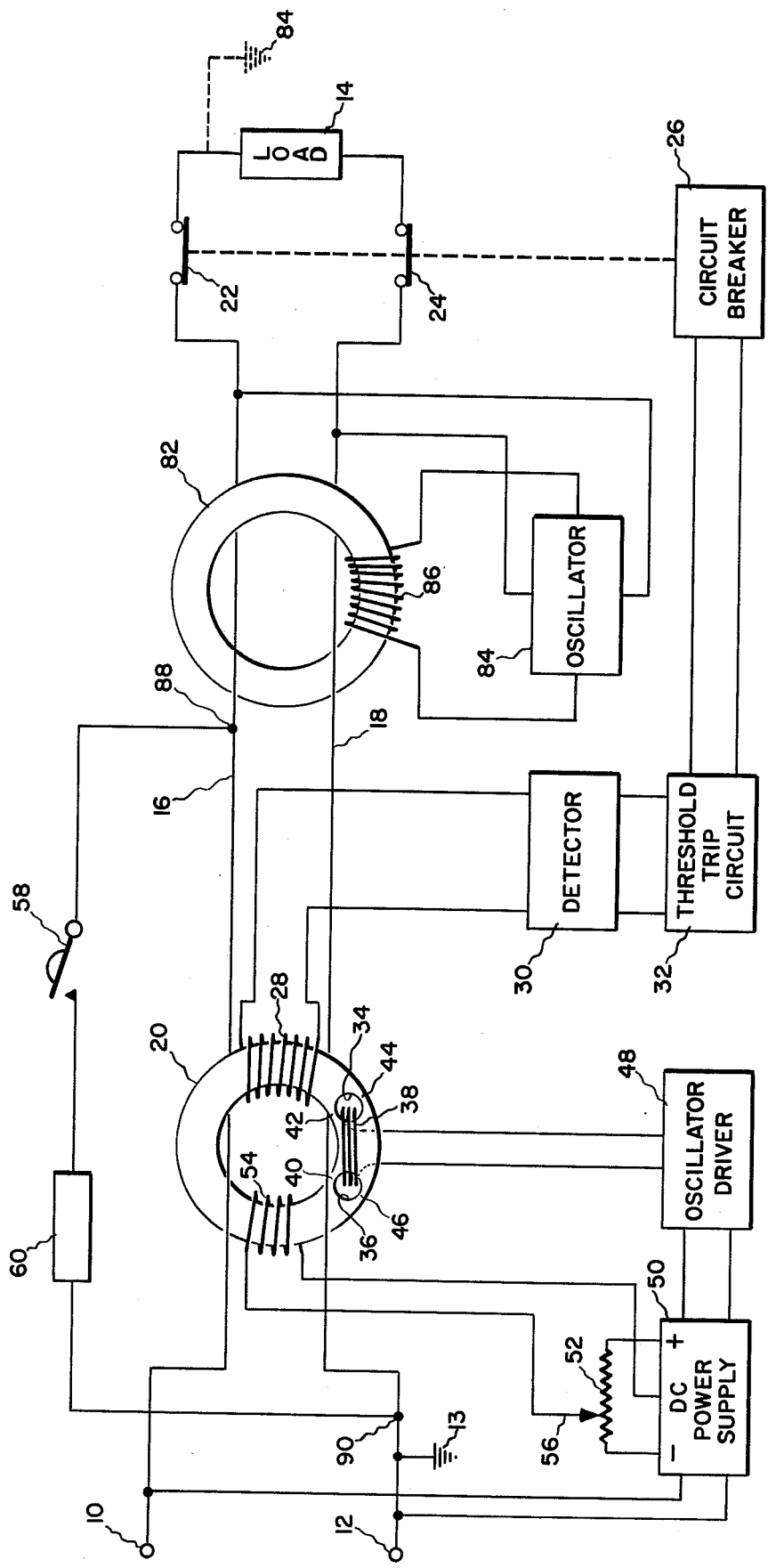
FIG. 1 is a block schematic diagram showing a preferred embodiment of the invention in the form of an improved ground fault circuit interrupter.

The illustrative system shown in FIG. 1 is merely exemplary of the environment in which the invention may be practiced. Thus the invention is described in the context of a single phase, two wire AC electrical distribution system with a neutral conductor grounded at the supply end and with the novel apparatus connected between a 60 Hz AC supply and at least one load. Other types of electrical systems, e.g. a DC system, a three phase system etc., may be provided with a ground fault interrupter in accordance with this invention, as will be apparent to those skilled in the art.

Referring now to FIG. 1, a ground fault circuit interrupter (GFCI) apparatus in accordance with the invention includes a pair of supply line terminals 10 and 12 for connecting a 60 Hz AC voltage source (not shown) to a load 14 by means of a line conductor 16 and a neutral line conductor 18 grounded at the supply end of the distribution system, as at 13. Each of the line conductors passes through an opening in the center of a magnetically controlled core 20, preferably composed of a ferrite material. The normally closed contacts 22 and 24 of a circuit breaker 26 of conventional design are connected in the line conductors 16 and 18 in series with the AC line terminals and the load 14.

An output sense winding 28 is wound on the magnetic core and is connected to supply a signal voltage that is induced therein to a conventional amplitude detector 30 where the signal is rectified and then filtered to remove any high frequency signal components. The detector 30 may consist of a simple diode rectifier followed by a low pass filter that passes signal frequencies in the 60 Hz range. A threshold trip circuit 32 is coupled to the output of the detector and may include a silicon controlled rectifier (SCR) which is activated when the detector output signal exceeds a predetermined level set in accordance with the level of current imbalance which it is desired to detect in line conductors 16 and 18. The trip circuit in turn controls the circuit breaker 26, also of a conventional nature, and which may consist merely of a trip coil (for activating the contacts 22, 24) connected in series with the aforesaid silicon controlled rectifier across the terminals of a voltage source. The gate electrode of the SCR will be triggered by the output of the detector circuit.

The magnetic flux control means consists of a pair of holes 34 and 36 located in the body of core 20 and a control winding 38 wound through the holes so that a current of the proper magnitude flowing in the control winding will saturate the core in the region surrounding the holes 34 and 36 thereby interrupting or impeding the flow of any circulating flux in the core. The core control region includes the two holes 34 and 36, control winding 38 and the thin wall areas 40, 42, 44 and 46. The control winding 38 is energized by the output of a drive oscillator 48, which may consist of a conventional sinusoidal oscillator, a square wave or pulse generator, or other obvious current generators suitable for the purpose disclosed. Interruption of a circulating flux occurs when the control winding is driven by drive oscillator 48 to produce a flux level in the core control region such that the thin wall areas 40-46 are saturated, or at least nearly saturated. As described above, when the core control region approaches saturation, the reluctance of the region increases so as to oppose the flow of a circulating flux in the core. Best results are obtained by driving the core into hard saturation. Since the control region is magnetically in series with the main magnetic path of the core, a circulating magnetic flux will respond to a change in reluctance, or to magnetic saturation, of the core control region.

A conventional DC power supply 50 has input terminals connected to the AC line conductors 16 and 18 and output terminals connected to supply the DC operating voltages for the drive oscillator 48. The DC power supply has a further pair of positive and negative DC supply terminals which are connected to either end of a bias control potentiometer 52. A DC core bias winding 54 is wound on the core 20 and is connected to the DC supply via an adjustable arm 56 of the control potentiometer. The DC current in bias winding 54 is adjusted to a given level by the potentiometer so that the magnetic core 20 is preferably biased to the linear portion of its characteristic B-H curve. The core is DC biased in order to overcome any residual flux density that may exist in the core. The bias winding also provides a means for compensating the effects of any external magnetic fields in the vicinity of the core and its various windings. The DC core bias also stabilizes the waveform and amplitude of the output signal from the sense winding 28 thereby maintaining the device sensitivity and providing a reliable signal free from the adverse affects caused by magnetically shocking the core. It will of course be obvious that a separate bias winding is not essential since the sense winding 28 can also function as the bias winding in a manner similar to that described in U.S. Pat. No. 3,859,567 in the name of John J. Allard.

FIGS. 2-5 illustrate the influence of various DC bias levels on signal field strengths in relation to the resultant magnetic flux density. The dashed line segments of the curves represent the effects on a core having a remanent flux condition.

Figure 2:
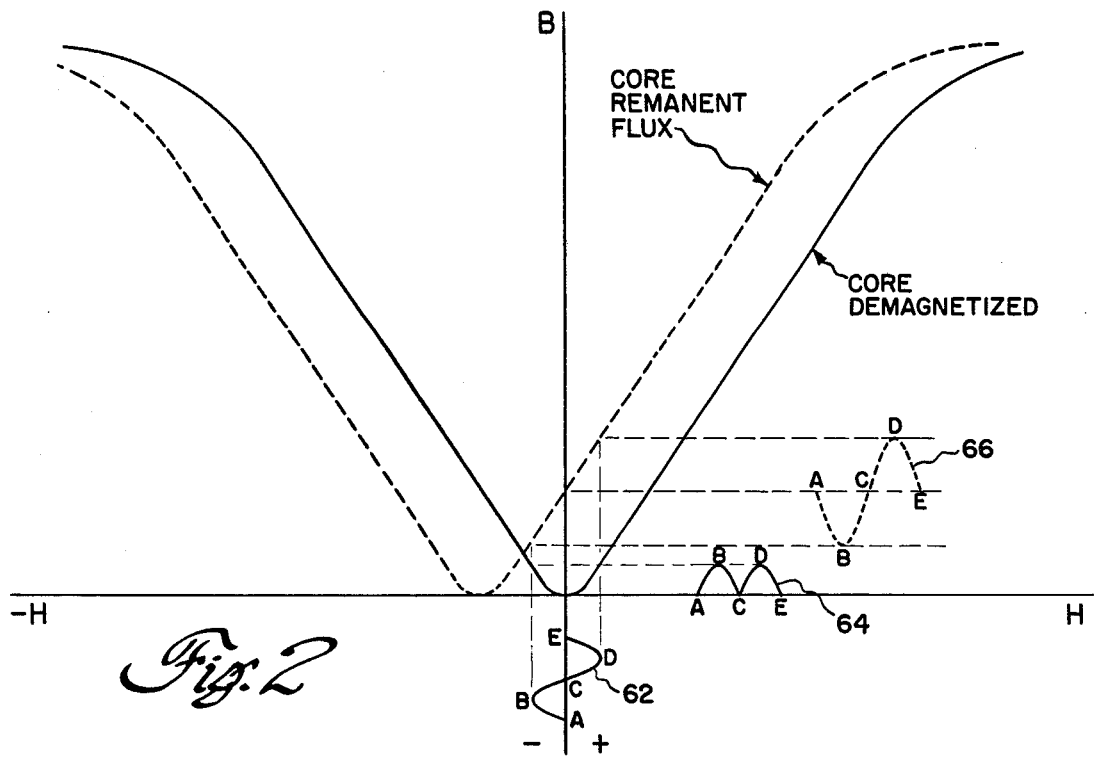
FIGS. 2-5 show waveforms illustrating the effects produced by different levels of magnetic bias in the core.

FIG. 2 shows the B-H curve for a zero bias condition. In the case of a sinusoidal input signal 62, a demagnetized core will follow the solid line curve and will yield a symmetrically distorted output signal illustrated by the waveform 64. This occurs because the only flux present in the core is that induced by the symmetrical sine wave signal 62 which varies uniformly in both the positive and negative directions. Zero flux density of the curve appears at the origin. The unbiased signal is applied equally to both quadrants of the characteristic curve thereby producing a distorted symmetrical flux density. However, should the core be subjected to a large DC magnetic field, the core will then support a residual magnetic flux density that will tend to shift the characteristic curve to the right or to the left, as is illustrated by the dashed line portion of the curve in FIG. 2. The input signal is then applied to the linear portion of the dashed curve producing an undistorted sine wave flux density pattern illustrated by curve 66. The residual flux density in the core can be viewed as a form of bias. It will be evident from the curves of FIG. 2 that a given input signal under zero bias conditions can produce output waveforms of a different amplitude and with different waveforms, depending upon the magnetic history of the core and/or on the existence of stray magnetic fields in the area.

Figure 3:
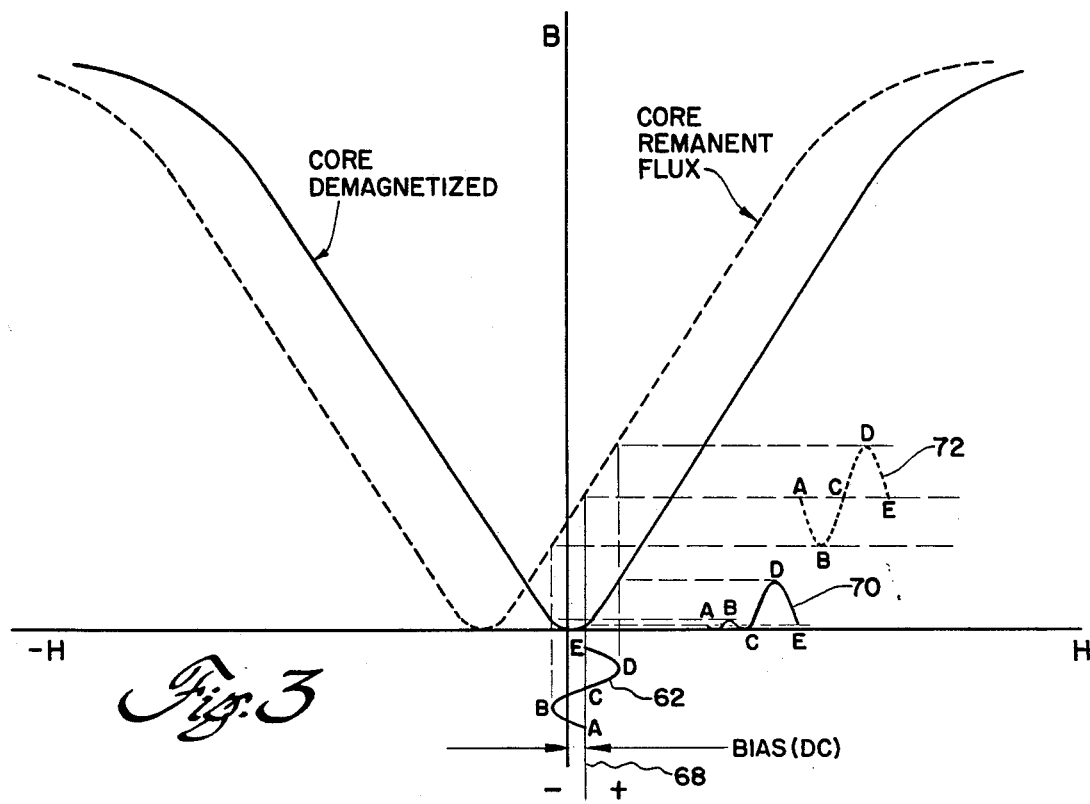

In FIG. 3 there is shown the situation in which a small amount of DC bias flux was induced into the core thereby shifting the signal operating point to the right, as indicated by the line 68. This is an under bias condition because the signal 62 is still being applied to both quadrants of the characteristic curve. In the case of a demagnetized core (zero remanent flux condition- solid line characteristic curve in FIG. 3), since the DC bias has shifted the operating point, the resultant flux density pattern now takes the form of the distorted, asymmetrical waveform 70. However, in the case of a core under the influence of a residual flux density (dashed line characteristic curve), the signal is again applied to the linear portion of the characteristic curve so that an undistorted sinusoidal flux wave pattern 72 is produced. Of course, if the polarity of the DC bias flux were reversed, the operating point would be shifted into the opposite quadrant so that the waveform 72 could possibly then be distorted if the operation is no longer on the linear portion of the characteristic curve. The polarity of the residual flux density in the core may also affect the flux density waveform when the core is in the under biased state illustrated in FIG. 3.

Figure 4:
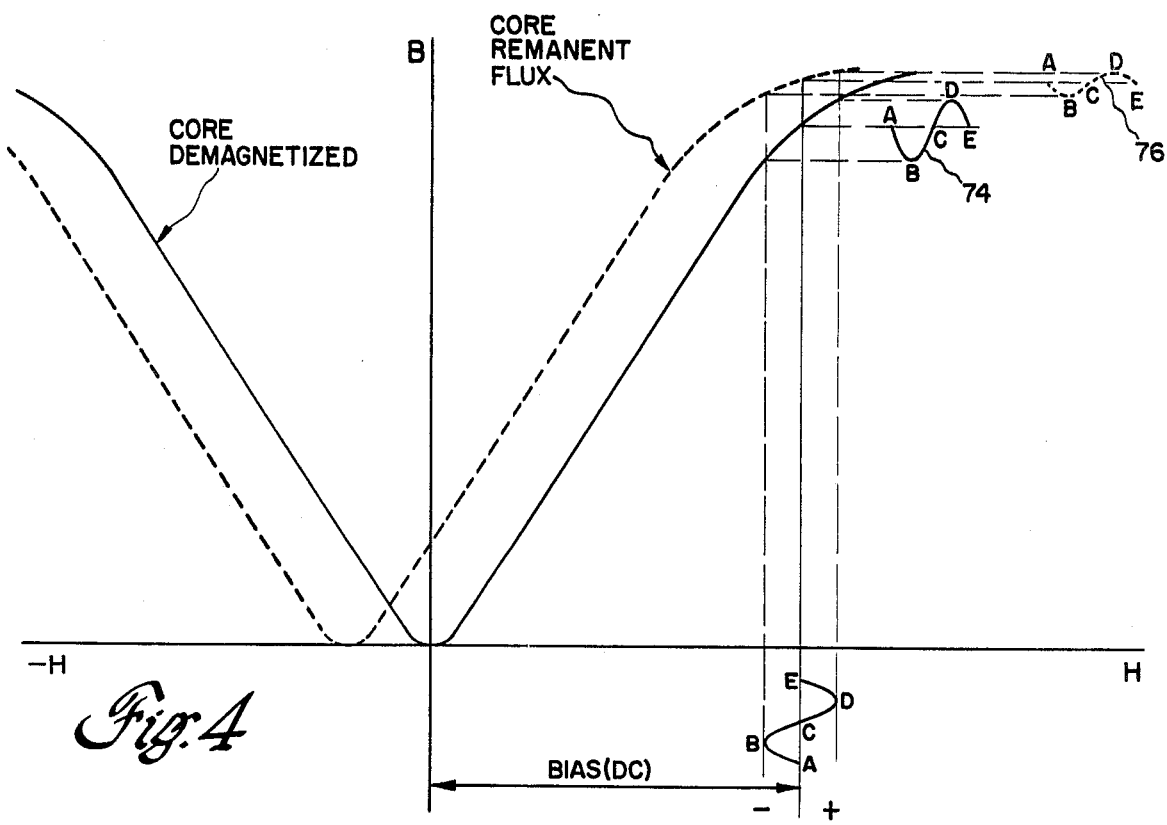

FIG. 4 illustrates the resultant waveforms in the case of an over bias condition, i.e. where the DC bias has shifted the operating point of the core up onto the knee portion of the characteristic B-H curve. In the over bias condition, a distorted resultant flux density pattern is produced with both a demagnetized and magnetized core, as is illustrated by the waveforms 74 and 76, respectively. The three bias conditions shown in FIGS. 2-4 are unfavorable in that for each bias condition a distorted signal waveform occurred in one or both core magnetization conditions, i.e. a demagnetized or a magnetized core. In addition, for a given input signal amplitude, the amplitude values of the flux waveforms varied between the magnetized and demagnetized core conditions, thereby limiting the reliability of operation of the device in the vicinity of the threshold trigger levels.

Figure 5:
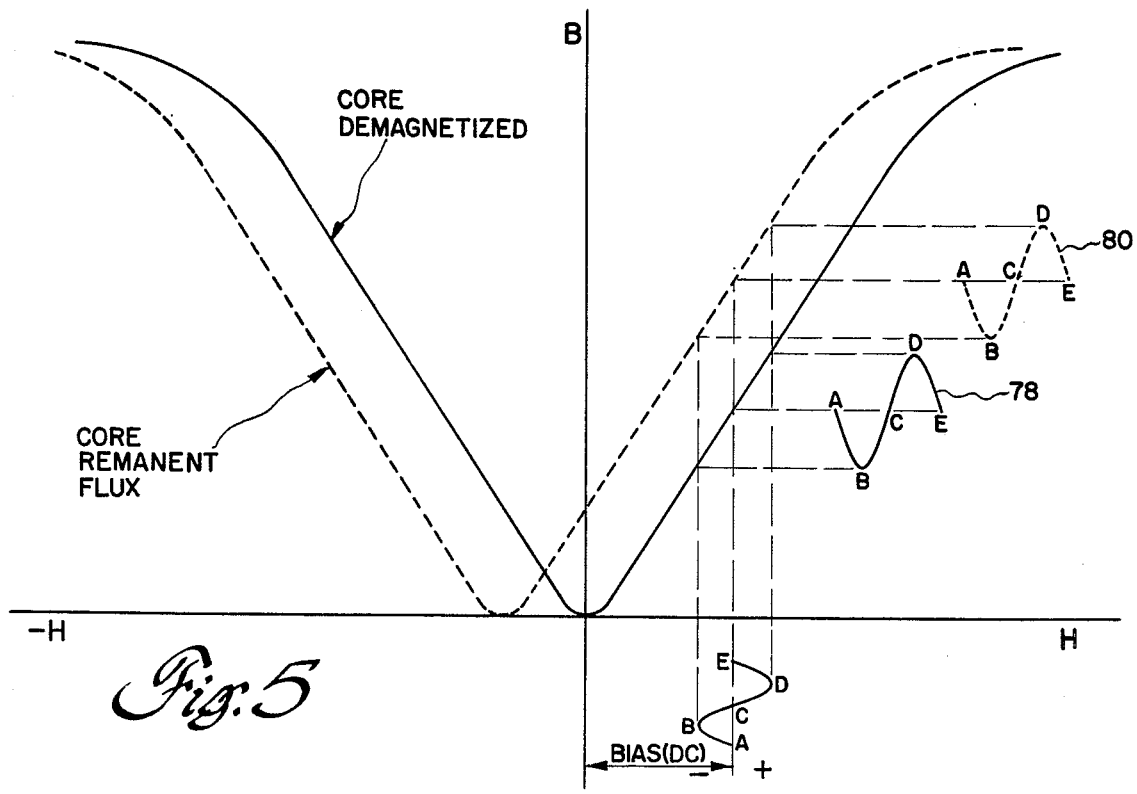

FIG. 5 illustrates the preferred bias condition of the core in which, for both sets of core conditions, i.e. demagnetized or magnetized, the operating point is located so that the signal is applied to the linear portions of the characteristic curve. Thus, as can be seen from waveforms 78 and 80, the preferred DC bias stabilizes the output signal in both waveform and amplitude, thereby maintaining the sensitivity of the device and providing a reliable signal free from any adverse effects due to stray magnetic fields, or which may be caused by magnetically shocking the core.

As is known, the occurrence of a ground at the load end of neutral conductor 18 will substantially reduce the sensitivity and therefore the ability of the ground fault detector to respond to ground faults occurring at the load end of the "hot" line conductor 16.

Referring again to FIG. 1, for the sake of completeness, a device for detecting the existence of a ground on the load end of the neutral conductor 18 will now be described briefly. The particular form that the grounded neutral detector will take is not essential to the practice of the present invention and, as many forms of grounded neutral detectors are known and available in theart for use herein, the description thereof will not go into great detail. A grounded neutral transformer is provided which includes a magnetic core 82 coupled to the line and neutral supply conductors 16 and 18. A conventional oscillator 84 is coupled to the line conductors so as to derive operating voltages therefrom. A winding 86 on the core 82 forms the primary of the grounded neutral transformer and is coupled to the oscillator 84. A ground occurring on the neutral conductor 18 causes this conductor to act as a shorted or low impedance one turn winding coupling the magnetic cores 20 and 82. The oscillations occurring in winding 86 are coupled via the core 82 to the neutral conductor 18 and via the latter conductor to induce an imbalance flux in the core 20. This imbalance flux in core 20 will induce an output sinal in sense winding 28 which in turn will trigger the circuit breaker 26 via detector 30 and threshold trip circuit 32, thereby opening line contacts 22 and 24 to remove power from the load. The imbalance flux in core 20 produced by the ground on conductor 18 is detected and processed as though it was a ground fault on conductor 16.

It will be understood that other forms of grounded neutral detection apparatus can be employed in the practice of this invention, such as the dormant oscillator apparatus of U.S. Pat. No. 3,878,435 issued to Donald L. Van Zeeland et al, the high frequency tickler voltage technique of U.S. Pat. No. 3,611,035 issued to Ellwood S. Douglas, the directly coupled transformers of U.S. Pat. No. 3,857,069 issued to Edward K. Howell, the impedance responsive oscillator of U.S. Pat. No. 3,916,261 in the same of Henry J. Zylstra et al, and so forth.

In the operation of the ground fault circuit interrupter of this invention, assuming that a load 14 is connected to the two line conductors 16 and 18, that no ground fault is present and that a grounded neutral condition does not exist, equal currents will flow in line conductors 16 and 18 to and from the load 14. Equal currents in conductors 16 and 18 will generate equal and opposing flux fields in the core 20 so that these two flux components will cancel each other to produce a zero value of net circulating flux in the core 20. With a zero net flux in the core 20 there will be no voltage induced in sense winding 28 and therefore the circuit breaker 26 will be inoperative and contacts 22 and 24 remain closed. However, when a ground fault condition occurs in conductor 16 on the load side of the core, as indicated by the dotted ground symbol 84, or in the load itself, the currents in conductors 16 and 18 are no longer equal and balanced so that a net magnetic flux is induced in the core and circulates in the closed magnetic path formed by said core. This unbalanced condition occurs because the entire supply current from input terminal 10 to the load flows through conductor 16, whereas the return current shares two paths, conductor 18 and the leakage ground path between ground terminals 84 and 13.

The unbalanced line currents induce a circulating magnetic flux in the core 20, which is biased to the linear portion of its characteristic curve by means of bias winding 54 and the adjustable DC current supplied thereto from the DC power supply 50 via potentiometer 52. The purpose of the DC bias has been described previously. The biased circulating flux in core 20 is interrupted in the core control region adjacent control winding 38 because the control winding is being driven by the oscillator driver 48 at a high frequency and with sufficient current so that the flux level induced in the core areas 40–46 produces saturation, or near saturation, therein. Each time the core control region 40–46 approaches magnetic saturation, the permeability drops and the reluctance of the region increases, thus opposing or impeding the circulating biased flux in the core. Since the control region is located magnetically in series with the core main magnetic path, the circulating magnetic flux will respond to the change in reluctance produced in the core control region.

The rate at which the biased circulating flux is interrupted is a function of the oscillator drive frequency and/or the type of current signal used to drive the control winding 38. For sine wave and non-return to zero square wave drive signals, the circulating flux is interrupted two times each cycle or twice the oscillator driver frequency. A single ended pulse will interrupt the signal flux at a frequency equal to the oscillator frequency. Oscillator frequencies in the range of 1 KHz to 1 MHz will provide satisfactory results depending upon the core material and type of construction. Higher frequencies than 1 MHz may be employed in specific cases.

The amplitude of the output signal induced in the sense winding 28 is dependent upon the rate of change at which the circulating flux linking the winding is interrupted $$\left( e = -N \frac{d\phi}{dt} \right).$$

The rate of change of flux is in turn controlled by the rate of change of current in the control winding. In the case of a sine wave control current, the rate of change is defined by its frequency. When square wave or pulse type control currents are used to drive the control winding, the rise time of the current waves determine the rate at which the circulating flux is interrupted. The rise times should be comparable to a range of sine wave frequencies from approximately 1 KHz to the low megahertz region. Rise times faster than $5\mu$ seconds are preferred. The use of square wave or pulse type signals with good rise times allows the use of low repetition rates, e.g. substantially below 1 KHz.

The relatively large output signal induced in the sense winding 28 is directly coupled to the input of a conventional detecttor 30 in order to retrieve the original signal information which resulted from the current imbalance in line conductors 16 and 18. The detector 30 may consist of a simple diode rectifier followed by a high frequency cut-off filter which removes any high frequency modulation components from the signal applied to the threshold trip circuit 32, such as the oscillator drive frequency. When a predetermined signal level is reached, the threshold trip circuit generates a trigger signal that energizes the circuit breaker 26 thereby opening line contacts 22 and 24 to interrupt the flow of power to the load.

The ground fault interrupter circuit can be tested without the presence of a ground fault in order to determine whether the circuit is functioning properly. A manually operable test switch 58 and a resistor 60 having a predetermined resistance value are serially connected between a junction point 88 on line 16 on the load side of core 20 and the grounded neutral conductor 18 at a point 90 on the input side of the core. By closing the test switch 58 a portion of the supply current in line conductor 16 is bypassed back to input terminal 12 via resistor 60 thereby causing a current imbalance in line conductors 16 and 18 that simulates a ground fault condition.

The current sensor described herein has a hih sensitivity and output because the circulating flux in the core is interrupted at a frequency substantially higher than the normal 60 Hz line frequency. The rate of change of flux linking the output sense coil of the novel apparatus described herein is much higher than in the prior art differential transformer GFCI devices wherein the output coil merely senses a 60 Hz flux signal. As a result, core materials having lower permeabilities and coils with fewer turns may be used in this apparatus. By controlling the reluctance of the core in the manner described, the current signal is effectively amplified by the magnetic core device to a level such that the output signal of the sense winding is adequate to operate the circuit breaker without the additional amplifier apparatus necessary to operate the prior art GFCI devices.

Figure 6:
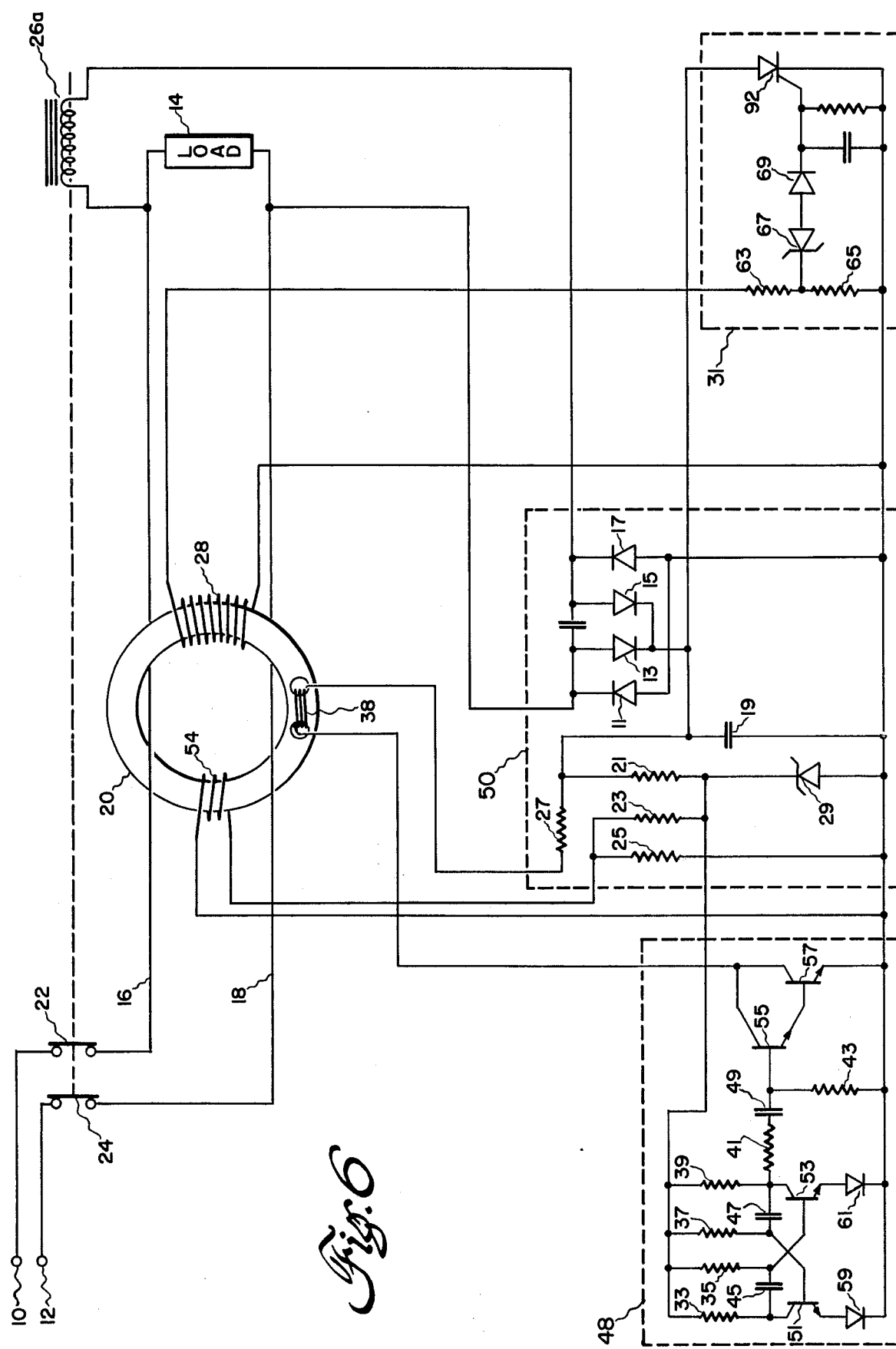
FIG. 6 is a circuit diagram of another embodiment of the invention.

FIG. 6 provides a detailed circuit diagram of another embodiment of the invention. Elements in FIG. 6 which are the same as those described with reference to FIG. 1 have the same reference numerals. AC input terminals 10 and 12 are coupled to a load 14 via line conductors 16 and 18, respectively. The line conductors pass through a magnetic core 20 on which are wound an output sense winding 28, a control winding 38 and a DC bias winding 54. A trip coil 26a is coupled to line conductors 16, 18 via the DC power supply 50 and SCR 92 of the combined detector and threshold trip circuit 31.

The DC power supply 50 consists of four diodes 11, 13, 15 and 17 connected in a bridge circuit with one input terminal connected to line conductor 16 via trip coil 26a and a second input terminal directly connected to line conductor 18. The SCR 92 is directly connected across the output terminals of the diode bridge circuit and is thus connected in series with the trip coil 26a across the line conductors. The power supply further comprises a capacitor 19, resistors 21, 23, 25 and 27 and a reference diode 29 which together provide DC power for the drive oscillator 48 and bias voltage for the core sensor device.

The drive oscillator 48 consists of a multivibrator circuit coupled to a Darlington current amplifier. The multivibrator circuit consists of resistors 33, 35, 37 and 39, capacitors 45 and 47, transistors 51 and 53 and diodes 59 and 61. The multivibrator circuit 51–53 triggers a Darlington current amplifier composed of transistors 55, 57 via a resistor 41, a capacitor 49 and a resistor 43. The output of the Darlington amplifier is coupled to control winding 38 so as to drive the control region of the core 20 into saturation at a predetermined duty cycle. The bias winding 54 receives a DC bias current from the power supply 50 via resistors 21, 23 and 25. Capacitor 19 is a filter capacitor.

The output sense winding 28 is connected across a voltage divider consisting of resistors 63 and 65 in series. A tap on the voltage divider is coupled to the gate electrode of SCR 92 via a serially connected reference diode 67 and a diode 69. In the abssnce of a ground fault, i.e. when the line currents in conductors 16 and 18 are equal, the output signal from the sense winding 28 consists of a high frequency carrier that appears across the voltage divider 63–65. The output signal level is set to a value just below the breakdown voltage of the reference diode 67 so that the reference diode will not then conduct. However, when a ground fault occurs, a current differential appears between line conductors 16 and 18. This current differential modulates the carrier which causes the reference diode 67 to conduct during a portion of the fault current cycle, depending on the carrier level that was selected. As the reference diode conducts, a signal is applied to the gate electrode of SCR 92 via diode 69. When the SCR conducts, sufficient current is drawn through trip coil 26a which responds thereto to open the contacts 22, 24 of the circuit breaker which thereby opens the line conductors 16, 18 supplying power to the load.

FIGS. 7–14 show various configurations of the magnetic core useful in the practice of the invention. FIG. 7 shows an annular magnetic core 20 with a single hole 34 through which a control winding (not shown) will be wound. In FIG. 8 an annular core 20 contains two diametrically opposed holes 34 and 36 through which a single control winding 38 may be wound. Alternatively, two separate control windings can be used, each one accomodated in a respective hole. FIGS. 9–11 illustrate square core designs using two or three piece construction. In FIG. 9, two "C" cores 20a and 20b are shown each containing a groove 36 and 34, respectively, in a mating surface so as to form holes to accomodate one or more control windings when the two halves of the core are fastened together, as by the use of a suitable glue or mechanical clamp. FIG. 10 shows a "C" core 20 with grooves openings 36 and 34 and with the open end of the core closed by a magnetic bar 20c fastened thereto.

FIG. 11, shows a large "C" core 20 and a small "C" core 20d both having their open ends closed by a common magnetic "I" bar 20e. The small "C" core and the "I" bar accomodate the control winding 38, which together form the control section of the magnetically controlled core.

FIG. 12 illustrates two flat annular cores 20a and 20b each containing an annular groove 34a and 34b, respectively, in a mating surface. A control winding 38 is placed in the groove and then the two core halves 20a and 20b are fastened together to form a single annular core with an internal control winding located in the internal groove formed therein.

FIG. 13 shows a core configuration which utilizes different magnetic materials selected to provide the optimum magnetic characteristics for each section of the core. The "C" core 20 is made of a magnetic material that provides such characteristics as low remanent magnetization, reasonably high permeability and low temperature coefficients typical of many manganese and nickel zinc ferrites, e.g. Ferroxcube 3B7 material. A pair of magnetic bars 40 and 42 having relatively small cross-sectional areas are mounted in the air gap between the opposing faces of the "C" core. The bars 40 and 42 form the control region and they are composed of magnetic materials that require low magnetizing forces to provide material saturation and low $B_{sat}$ levels. They also should offer a large change in permeability or reluctance when switched from one state to the other, e.g. Ferroxcube 3E2A. A control winding or windings will be wound around the bars 40 and 42 to provide periodic saturation thereof during operation of the device.

FIG. 14 shows an annular magnetic core 20 with a gap 76 through the core cross section parallel to the core axis. A ferromagnetic armature 78 is coupled to a ferroelectric driver 80. The ferroelectric is excited with a voltage at a frequency which corresponds to the mechanical resonant frequency of the armature/ferroelectric combination, causing the armature to oscillate back and forth past the gap in the mangetic core. The reluctance of the core magnetic circuit is minimum when the armature is adjacent to the gap. Maximum reluctance occurs when the armature reaches the end of its travel when changing direction. Consequently, as the armature traverses away from the gap, a circulating flux present in the core is impeded sufficiently to provie a means of control. A signal voltage is thereby induced in sense winding 28 and will be processed in a similar fashion to that described earlier.

While the invention has been described with reference to a specific embodiment of the basic circuitry, it will be apparent to those skilled in the art that various changes and modifications can be made without departing from the spirit and scope of the invention as set forth in the claims. Furthermore, it will be apparent that the invention, while specifically described with reference to a two-wire distribution system, can be used with a three wire system, or in general to detect a low level current flowing in a single conductor. All matter contained in the above description and the accompanying drawings are to be regarded as illustrative rather than in a limiting sense.

We claim:

1. A current sensing apparatus comprising a magnetically controlled ferromagnetic core adapted to be magnetically coupled to an electric conductor in which the current to be sensed flows and providing a magnetic circuit for the flow of a circulating flux determined by said current, control winding means magnetically coupled to said core for applying a periodic magnetic flux to at least a part of said core magnetic circuit, means for supplying a periodic current to said control winding means of a magnitude to induce a magnetic flux in said part of the core magnetic circuit so as to produce substantial changes in the core permeability sufficient to substantially alter the magnitude of said circulating flux when it is present in the core magnetic circuit, an output winding magnetically coupled to said core for deriving an output signal voltage determined by the rate of change of the altered circulating flux, means coupled to said core for establishing a DC bias flux therein of a magnitude to bias the core onto a linear segment of its B-H characteristic curve, and signal processing means coupled to said output winding for processing said output signal.

2. A current sensing apparatus as claimed in claim 1 wherein the control winding means produces a periodic magnetic flux in said core part of a magnitude to drive said core part into and out of magnetic saturation.

3. A ground fault interrupter apparatus comprising, a ferromagnetic core adapted to be coupled to the line and neutral conductors of an electric distribution system coupling a source of electric energy to a load, said neutral conductor being grounded at a supply terminal thereof, an output sense winding magnetically coupled to said core for deriving an output signal voltage determined by the rate of change of magnetic flux circulating in said core, control winding means magnetically coupled to a control region of said core through which said circulating flux passes, said circulating flux being established in said core by a current imbalance in said line and neutral conductors, means coupled to said core for establishing a DC bias flux therein of a magnitude to bias the core onto a linear segment of its B-H characteristic curve, and means for applying a periodic current to said control winding means to induce a varying magnetic flux in said core control region of a magnitude to produce substantial variations in the core permeability sufficient to interrupt any circulating flux in the core and at a rate that is substantially higher than the rate of variation, if any, of the circulating flux produced by said current imbalance.

4. A ground fault interrupter apparatus as claimed in claim 3 wherein said line and neutral conductors are adapted to be coupled to a source of AC current of a frequency of approximately 60 Hz, and wherein said periodic current applying means comprises a source of sinusoidal AC current of a frequency substantially higher than 60 Hz.

5. A ground fault interrupter apparatus as claimed in claim 3 wherein said periodic current applying means comprises a source of pulse-type signals having a relatively fast transition time.

6. A ground fault interrupter apparatus as claimed in claim 3 wherein said periodic current applying means supplies a current to said control winding means of a magnitude whereby the control winding means drives said control region into magnetic saturation at said substantially higher rate.

7. A ground fault interrupter apparatus as claimed in claim 3 further comprising circuit breaker means operative to open at least one of said conductors to interrupt the flow of current to the load, signal detection means coupled to said output sense winding, and a threshold level circuit coupled to said detection means and to said circuit breaker means and responsive to a signal of a predetermined magnitude from said detection means for triggering said circuit breaker means into operation.

8. A current sensing apparatus comprising, an annular magnetic core having a radial air gap and adapted to be magnetically coupled to a current carrying electric conductor thereby to provide a magnetic circuit for the flow of a signal flux determined by said current, means for controlling a signal flux present in the core including electro-mechanical means for changing the reluctance of the core magnetic circuit so as to momentarily impede the flow of the signal flux, said electro-mechanical means comprising a ferromagnetic armature mounted to oscillate parallel to said air gap, and an output winding magnetically coupled to said core for deriving an output signal determined by the rate of change of the signal flux which is produced by said electro-mechanical means.

9. A ground fault interrupter apparatus comprising, a C-shaped ferromagnetic core made of a first magnetic material and a magnetic member mounted in the air gap formed by the end faces of the C-shaped core and composed of a different magnetic material than the core, said core being adapted to be coupled to the line and neutral conductors of an electric distribution system coupling a source of electric energy to a load, said neutral conductor being grounded at a supply terminal thereof, an output sense winding magnetically coupled to said core for deriving an output signal voltage determined by the rate of change of magnetic flux circulating in said core, control winding means magnetically coupled to a control region of said core through which said circulating flux passes, said circulating flux being established in said core by a current imbalance in said line and neutral conductors, and means for applying a periodic current to said control winding means to induce a varying magnetic flux in said core control region of a magnitude to produce substantial variations in the core permeability sufficient to interrupt any circulating flux in the core and at a rate that is substantially higher than the rate of variation, if any, of the circulating flux produced by said current imbalance.

10. A ground fault interrupter apparatus comprising, a ferromagnetic core adapted to be coupled to the line and neutral conductors of an electric distribution system coupling a source of electric energy to a load with said netural conductor being grounded at a supply terminal thereof, said ferromagnetic core comprising a C-shaped core having grooves formed in the end faces thereof and a magnetic member extending across said end faces and in contact therewith to close the open ends of said grooves, an output sense winding magnetically coupled to said core for deriving an output signal voltage determined by the rate of change of magnetic flux circulating in said core, control winding means magnetically coupled to a control region of said core through which said circulating flux passes, said circulating flux being established in said core by a current imbalance in said line and neutral conductors, and means for applying a periodic current to said control winding means to induce a varying magnetic flux in said core control region of a magnitude to produce substantial variations in the core permeability sufficient to interrupt any circulating flux in the core and at a rate that is substantially higher than the rate of variation, if any, of the circulating flux produced by said current imbalance.

11. A ground fault interrupter apparatus comprising, a ferromagnetic core adapted to be coupled to the line and neutral conductors of an electric distribution system coupling a source of electric energy to a load with said neutral conductor being grounded at a supply terminal thereof, said ferromagnetic core comprising first and second C-shaped cores arranged in confronting relationship and a magnetic bar member sandwiched between and in contact with the confronting end faces of the two cores so as to form a unitary body having at least one window formed therein for receiving a winding, an output sense winding magnetically coupled to said core for deriving an output signal voltage determined by the rate of change of magnetic flux circulating in said core, control winding means magnetically coupled to a control region of said core through which said circulating flux passes, said circulating flux being established in said core by a current imbalance in said line and neutral conductors, and means for applying a periodic current to said control winding means to induce a varying magnetic flux in said core control region of a magnitude to produce substantial variations in the core permeability sufficient to interrupt any circulating flux in the core and at a rate that is substantially higher than the rate of variation, if any, of the circulating flux produced by said current imbalance.

* * * * *